United States Patent
Xu et al.

(10) Patent No.: US 11,218,000 B2
(45) Date of Patent: Jan. 4, 2022

(54) MAXIMUM POWER POINT TRACKING METHOD AND DEVICE

(71) Applicant: HUAWEI TECHNOLOGIES CO., LTD., Guangdong (CN)

(72) Inventors: Zhiwu Xu, Shanghai (CN); Zhiqing Wu, Shanghai (CN); Guilei Gu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/114,991

(22) Filed: Dec. 8, 2020

(65) Prior Publication Data

US 2021/0119454 A1    Apr. 22, 2021

Related U.S. Application Data

(63) Continuation of application No. PCT/CN2019/103789, filed on Aug. 30, 2019.

(30) Foreign Application Priority Data

Nov. 15, 2018 (CN) .......................... 201811357673.7

(51) Int. Cl.
 *H02J 3/38* (2006.01)
 *H02S 40/32* (2014.01)
 *H02J 7/35* (2006.01)

(52) U.S. Cl.
 CPC ................ *H02J 3/381* (2013.01); *H02J 7/35* (2013.01); *H02S 40/32* (2014.12); *H02J 2300/26* (2020.01)

(58) Field of Classification Search
 CPC ...... H02J 3/38; H02J 3/381; H02J 7/35; H02J 300/26; H02S 40/32
 See application file for complete search history.

*Primary Examiner* — Robert L Deberadinis
(74) *Attorney, Agent, or Firm* — Womble Bond Dickinson (US) LLP

(57) ABSTRACT

This application provides a maximum power point tracking method and a device, to improve conversion efficiency of a control device in a photovoltaic power generation system, and reduce a loss of a power generation capacity. The method includes: adjusting, by the control device, an input voltage of the control device, where the input voltage is generated by one or more of the photovoltaic module and is transmitted to the control device; determining whether a difference between a first input power and a second input power of the control device is less than or equal to a setpoint, adjusting the input voltage of the control device according to the first input power and the second input power.

12 Claims, 9 Drawing Sheets

MAXIMUM POWER POINT TRACKING METHOD AND DEVICE

CROSS-REFERENCE TO RELATED APPLICATIONS

This application is a continuation of International Patent Application No. PCT/CN2019/103789, filed on Aug. 30, 2019, which claims priority to Chinese Patent Application No. 201811357673.7, filed on Nov. 15, 2018. The disclosures of the aforementioned applications are hereby incorporated by reference in their entireties.

TECHNICAL FIELD

This application relates to the field of photovoltaic power generation technologies, and in particular, to a maximum power point tracking method and a device.

BACKGROUND

Solar energy is a massive renewable resource, and radiant energy that reaches the surface of the earth every day is equivalent to energy generated when hundreds of millions of barrels of oil are burnt, and development and use of solar energy cause little pollution to the environment, and even does not pollute the environment. Photovoltaic (PV) power generation is a most common manner of using solar energy, can directly convert photon energy into electric energy, and has advantages such as high reliability, a long service life, and being environment-friendly.

A photovoltaic array in a photovoltaic power generation system is installed outdoors, and is affected by external factors such as light intensity and environment. For example, a photovoltaic module in the photovoltaic array is blocked, and an output power of the photovoltaic module varies. In an existing technology, a converter is added to the photovoltaic module in the photovoltaic array, and a maximum power point tracking (MPPT) method is used in an inverter connected to the photovoltaic module. To be specific, an output voltage of the photovoltaic module is perturbed, output powers of the photovoltaic module that are obtained before and after the perturbation are compared, and when the output powers of the photovoltaic module that are obtained before and after the perturbation are the same, the output power of the photovoltaic module is a maximum power point of the photovoltaic module, and the photovoltaic module is kept working at the maximum power point, to improve efficiency of the photovoltaic power generation system to the greatest extent.

However, for a scenario in which a converter is configured in each photovoltaic module in a photovoltaic array, introduction of the converter changes an output characteristic of the original photovoltaic module. An output characteristic of the converter includes a constant power interval. Although the converter can be controlled to work in the constant power interval when an inverter uses the MPPT method, and in this case, the photovoltaic module connected to the converter works at a maximum power point, an output voltage of the converter is unstable, that is, an input voltage of the inverter is unstable. When the inverter works at a low voltage and high current input, conversion efficiency of both the converter and the inverter decreases, leading to a loss of a power generation capacity.

SUMMARY

This application provides a maximum power point tracking method and a device, to resolve a prior-art problem that conversion efficiency of a converter and an inverter is relatively low in a scenario in which the converter is configured in each photovoltaic module in a photovoltaic power generation system.

According to a first aspect, this application provides a maximum power point tracking method, applied to a photovoltaic power generation system, where the photovoltaic power generation system includes a control device and at least one photovoltaic module. The method includes: adjusting, by the control device, an input voltage of the control device, where the input voltage is generated by one or more of the photovoltaic module and is transmitted to the control device; determining whether a difference between a first input power and a second input power of the control device is less than or equal to a setpoint, where the first input power is an input power of the control device that is obtained before the input voltage of the control device is adjusted, and the second input power is an input power of the control device that is obtained after the input voltage of the control device is adjusted; when the difference between the first input power and the second input power is less than or equal to the setpoint, increasing the input voltage of the control device, and determining whether the difference between the first input power and the second input power of the control device is less than or equal to the setpoint; and when the difference between the first input power and the second input power is greater than the setpoint, adjusting the input voltage of the control device.

According to the foregoing method, the control device adjusts the input voltage of the control device, and determines whether the input powers that are obtained before and after the input voltage of the control device is adjusted are equal or approximately equal, and if the input powers are equal or approximately equal, increases the input voltage of the control device, and continues to determine whether the input powers that are obtained before and after the input voltage of the control device is adjusted are equal or approximately equal; or if the input powers are not equal or approximately equal, continues to adjust the input voltage of the control device, so that the control device works at a maximum input power point. When the control device works at the maximum input power point, the input voltage of the control device is relatively high, so that conversion efficiency of the control device can be improved to the greatest extent, and a loss of a power generation capacity of the photovoltaic power generation system can be reduced.

In an embodiment, when the difference between the first input power and the second input power of the control device is greater than the setpoint, the control device may adjust the input voltage of the control device by using the following method:

when the first input power is less than the second input power, if the input voltage of the control device before the adjustment is greater than an input voltage of the control device obtained after the adjustment, decreasing the input voltage of the control device, or if the input voltage of the control device before the adjustment is less than an input voltage of the control device obtained after the adjustment, increasing the input voltage of the control device; or when the first input power is greater than the second input power, if the input voltage of the control device before the adjustment is greater than an input voltage of the control device obtained after the adjustment, increasing the input voltage of the control device, or if the input voltage of the control device before the adjustment is less than an input voltage of the control device obtained after the adjustment, decreasing the input voltage of the control device.

In an embodiment, the control device is an inverter or a solar charger.

In an embodiment, the photovoltaic power generation system further includes at least one converter, one of the converter is connected to one of the photovoltaic module. In other words, the converter is configured in some or all of the at least one photovoltaic module included in the photovoltaic power generation system. The converter is configured to: adjust an output voltage or current of a photovoltaic module connected to the converter, so that the photovoltaic module connected to the converter works at a maximum output power point; and adjust an output voltage or an output current of the converter under control of the control device.

According to a second aspect, this application provides another maximum power point tracking method, applied to a photovoltaic power generation system, where the photovoltaic power generation system includes a control device and at least one photovoltaic module. The method includes: adjusting, by the control device, an input current of the control device, where the input current is generated by one or more of the photovoltaic module and is transmitted to the control device; determining whether a difference between a first input power and a second input power of the control device is less than or equal to a setpoint, where the first input power is an input power of the control device that is obtained before the input current of the control device is adjusted, and the second input power is an input power of the control device that is obtained after the input current of the control device is adjusted; when the difference between the first input power and the second input power is less than or equal to the setpoint, decreasing the input current of the control device, and determining whether the difference between the first input power and the second input power of the control device is less than or equal to the setpoint; and when the difference between the first input power and the second input power is greater than the setpoint, adjusting the input current of the control device.

According to the foregoing method, the control device adjusts the input current of the control device, and determines whether the input powers that are obtained before and after the input current of the control device is adjusted are equal or approximately equal; and if the input powers are equal or approximately equal, increases the input current of the control device, and continues to determine whether the input powers that are obtained before and after the input current of the control device is adjusted are equal or approximately equal; or if the input powers are not equal or approximately equal, continues to adjust the input current of the control device, so that the control device works at a maximum input power point. When the control device works at the maximum input power point, the input current of the control device is relatively low, so that conversion efficiency of the control device can be improved to the greatest extent, and a loss of a power generation capacity of the photovoltaic power generation system can be reduced.

In an embodiment, when the difference between the first input power and the second input power is greater than the setpoint, the control device may adjust the input current of the control device by using the following method: when the first input power is less than the second input power, if the input current of the control device before the adjustment is greater than an input current of the control device obtained after the adjustment, decreasing the input current of the control device, or if the input current of the control device before the adjustment is less than an input current of the control device obtained after the adjustment, increasing the input current of the control device; or when the first input power is greater than the second input power, if the input current of the control device before the adjustment is greater than an input current of the control device obtained after the adjustment, increasing the input current of the control device, or if the input current of the control device before the adjustment is less than an input current of the control device obtained after the adjustment, decreasing the input current of the control device.

In an embodiment, the control device is an inverter or a solar charger.

In an embodiment, the photovoltaic power generation system further includes at least one converter, one of the converter is connected to one of the photovoltaic module, and the converter is configured to: adjust an output voltage or current of a photovoltaic module connected to the converter, so that the photovoltaic module connected to the converter works at a maximum output power point; and adjust an output voltage or an output current of the converter under control of the control device.

According to a third aspect, this application provides a control device. The control device has a function of implementing behavior of the control device in the method example in the first aspect. The function may be implemented by using hardware, or may be implemented by hardware executing corresponding software. The hardware or software includes one or more modules corresponding to the foregoing function.

In an embodiment, a structure of the control device includes an adjustment unit and a determining unit. The units may execute the corresponding function in the method example in the first aspect. For details, refer to the detailed descriptions in the method example, and details are not described herein again.

In an embodiment, the structure of the control device includes a processor, a memory, and a power conversion circuit. The processor is configured to support the control device in executing the corresponding function in the method provided in the first aspect. The memory is coupled to the processor, and stores a program instruction and data that are necessary to the control device.

According to a fourth aspect, this application provides another control device. The control device has a function of implementing behavior of the control device in the method example in the second aspect. The function may be implemented by using hardware, or may be implemented by hardware executing corresponding software. The hardware or software includes one or more modules corresponding to the foregoing function.

In an embodiment, a structure of the control device includes an adjustment unit and a determining unit. The units may execute the corresponding function in the method example in the second aspect. For details, refer to the detailed descriptions in the method example, and details are not described herein again.

In an embodiment, the structure of the control device includes a processor, a memory, and a power conversion circuit. The processor is configured to support the control device in executing the corresponding function in the method provided in the second aspect. The memory is coupled to the processor, and stores a program instruction and data that are necessary to the control device.

According to a fifth aspect, this application provides a photovoltaic power generation system, where the photovoltaic power generation system includes the control device described in the first aspect and at least one photovoltaic module.

According to a sixth aspect, this application provides a photovoltaic power generation system, where the photovoltaic power generation system includes the control device described in the second aspect and at least one photovoltaic module.

According to a seventh aspect, this application further provides a computer storage medium, where the computer storage medium stores a computer executable instruction, and when the computer executable instruction is invoked by the computer, the computer is enabled to perform the method provided in any embodiment of the first aspect or the second aspect.

According to an eighth aspect, this application further provides a computer program product including an instruction, where when the instruction is run on a computer, the computer is enabled to perform the method provided in any embodiment of the first aspect or the second aspect.

According to a ninth aspect, this application further provides a chip. The chip is connected to a memory, or the chip includes the memory, and is configured to read and execute a software program stored in the memory, to implement the method provided in any embodiment of the first aspect or the second aspect.

DESCRIPTION OF EMBODIMENTS

In a scenario in which no converter is configured in each photovoltaic module in a photovoltaic power generation system, an output characteristic of the photovoltaic module does not include a constant power interval. When a converter is configured in each photovoltaic module, an output characteristic of the converter includes a constant power interval, and an output power of the photovoltaic module is a maximum output power in the constant power interval. For example, when a photovoltaic string in a photovoltaic array includes 10 photovoltaic modules connected in series, parameters of each photovoltaic module are shown in Table 1:

TABLE 1

| Parameters of a photovoltaic module | |
|---|---|
| Parameter | Value |
| Open-circuit voltage Voc | 38.25 V |
| Short-circuit current Isc | 9.95 A |
| MPP voltage Vmp | 30.6 V |
| MPP current Imp | 8.5 A |
| MPP power Pmp | 260.1 W |

Figure 1:
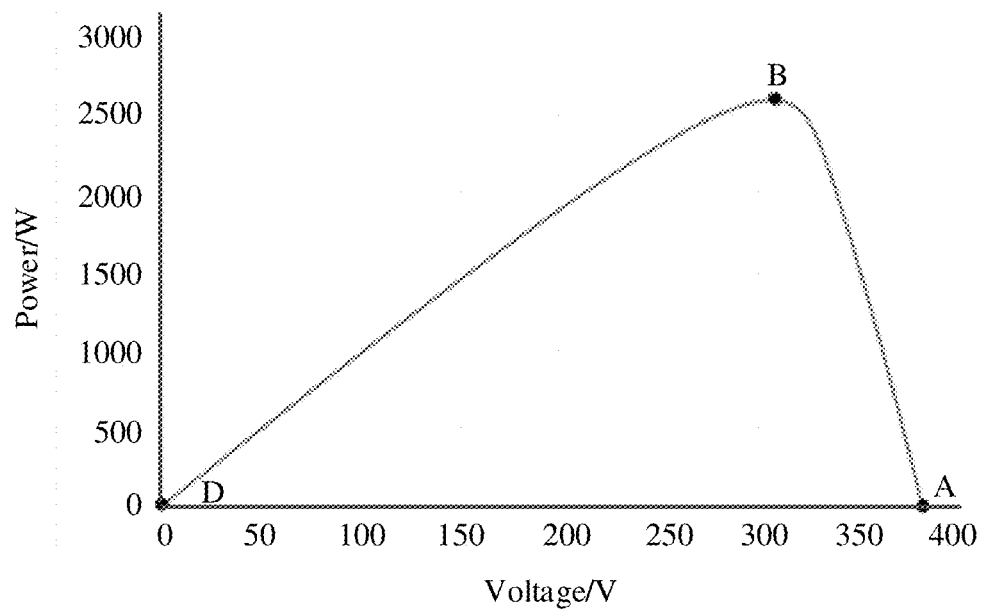
FIG. 1 is a schematic diagram of an output characteristic of a photovoltaic module in a scenario in which no converter is configured in the photovoltaic module.
Figure 2:
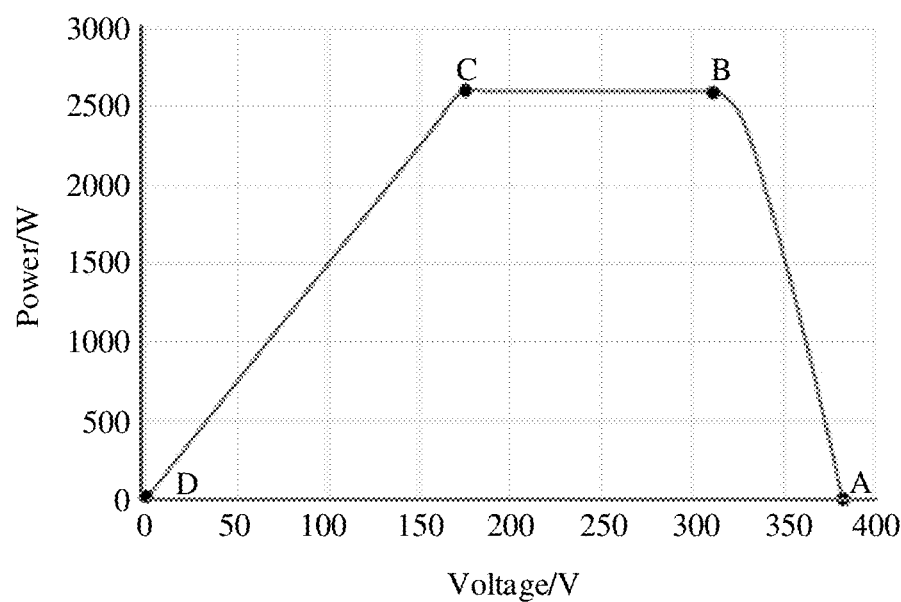
FIG. 2 is a schematic diagram of an output characteristic of a photovoltaic module in a scenario in which a converter is configured in the photovoltaic module.

In the scenario in which no converter is configured in each photovoltaic module, the output characteristic of the photovoltaic module is shown in FIG. 1. In the scenario in which the converter is configured in each photovoltaic module, the output characteristic of the converter is shown in FIG. 2. In FIG. 1, a horizontal axis represents an output voltage of the photovoltaic module, and a vertical axis represents an output power of the photovoltaic module. In FIG. 2, a horizontal axis represents an output voltage of the converter, and a vertical axis represents an output power of the converter. In the scenario in which the converter is configured in each photovoltaic module, the converter connected to each photovoltaic module is a buck converter, and outputs 15 A in a current limiting manner. As shown in FIG. 1, for the scenario in which no converter is configured in each photovoltaic module, when the photovoltaic module is at an open circuit, the photovoltaic module works at a point A, and a voltage at the point A is an open-circuit voltage of the photovoltaic module, or when the photovoltaic module is at a short circuit, the photovoltaic module works at a point D, and a maximum output power of the photovoltaic module is at a point B. It can be learned from FIG. 2 that for the scenario in which the converter is configured in each photovoltaic module, when the photovoltaic module is at an open circuit, the converter works at a point A, and a voltage at the point A is an open-circuit voltage of the photovoltaic module; when an output voltage of the converter is in an interval A-B, the photovoltaic module works at a non-maximum output power point, and the converter works in a straight-through mode; when an output voltage of the converter is in an interval B-C, the photovoltaic module works at a maximum output power point, and the converter works in a constant power mode; when an output voltage of the converter is in an interval C-D, the photovoltaic module works at a non-maximum output power point, and the converter works in a constant current mode; when the photovoltaic module is at a short circuit, the converter works at a point D.

In an existing MPPT method, a perturbation and observation method (the perturbation and observation method is also referred to as a hill climbing method) is usually used, and means that an output voltage of a photovoltaic module is perturbed (adjusted), output powers of the photovoltaic module that are obtained before and after the perturbation are calculated, and the two output powers that are obtained before and after the perturbation are compared. If the output power of the photovoltaic module that is obtained after the perturbation is increased compared with the output power of the photovoltaic module that is obtained before the perturbation, it indicates that the perturbation can increase the output power of the photovoltaic module, and the output voltage of the photovoltaic module is perturbed next time in a direction the same as that of the current perturbation; if the output power of the photovoltaic module that is obtained after the perturbation is decreased compared with the output power of the photovoltaic module that is obtained before the perturbation, it indicates that the perturbation does not help to increase the output power of the photovoltaic module, and the output voltage of the photovoltaic module is perturbed next time in a direction opposite to that of the current perturbation; if the output powers of the photovoltaic module that are obtained before and after the perturbation are the same, it indicates that the output power of the photovoltaic module is a maximum output power point, and the photovoltaic module stably works at the maximum output power point. It can be learned from FIG. 2 that for the scenario in which the converter is configured in each photovoltaic module, when the photovoltaic module works at the maximum output power point, the converter connected to the photovoltaic module works in a constant power mode; when an output voltage of the converter fluctuates in an output voltage interval corresponding to the constant power mode, the photovoltaic module can work at the maximum output power point; in a scenario in which the output voltage of the converter is a relatively low output voltage (for example, a point C in FIG. 2) in the output voltage interval corresponding to the constant power mode, that is, the converter connected to the photovoltaic module works at a relatively low output voltage, and a relatively high output current, and an inverter works at a relatively low input voltage and a relatively high input current, conversion efficiency of the converter and the inverter is relatively low, leading to a loss of a power generation capacity of the photovoltaic power generation system.

To resolve the foregoing prior-art problem, this application provides a maximum power point tracking method and a device. The method and the device in the embodiments of this application are based on a same idea. Because problem resolving principles of the method and the device are similar, mutual reference may be made to embodiments of the device and the method, and repeated parts are not described.

In addition, it should be understood that in the descriptions of this application, terms such as "first" and "second" are merely for the purpose of differentiating between descriptions, but cannot be understood as indicating or implying relative importance, and cannot be understood as indicating or implying a sequence.

Figure 3:
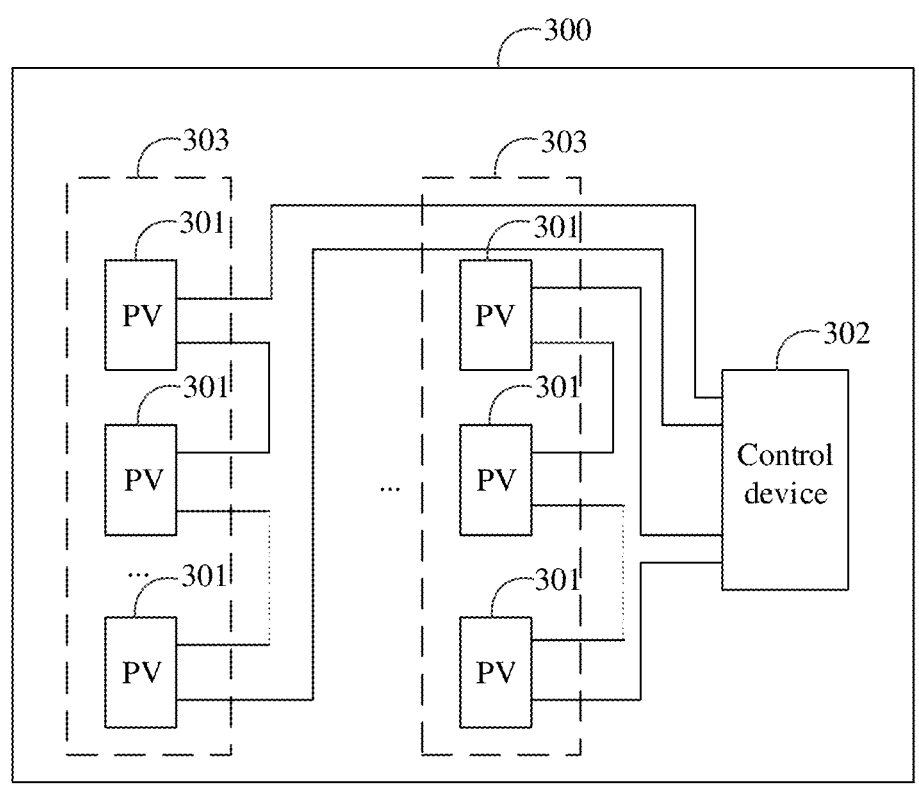
FIG. 3 is a schematic structural diagram of a photovoltaic power generation system according to an embodiment of this application.

This application provides a maximum power point tracking method, applied to a photovoltaic power generation system. As shown in FIG. 3, the photovoltaic power generation system 300 includes at least one photovoltaic module 301 and a control device 302. The photovoltaic module 301 is a module obtained by seamlessly packaging a plurality of (at least two) solar cells that are connected in series and in parallel, is a core part of the photovoltaic power generation system, and is configured to convert solar energy into electric energy. The control device 302 is configured to adjust an input voltage or an input current of the control device 302, so that the control device 302 can convert, with relatively high conversion efficiency, electric energy generated by the photovoltaic module 301, for example, convert the electric energy generated by the photovoltaic module 301 into an alternating current and input the alternating current to a power grid. Specifically, the control device 302 may be a device such as an inverter or a solar charger. The input voltage or the input current of the control device 302 is generated by one or more of the photovoltaic module 301 and is directly or indirectly transmitted to the control device 302.

Further, the at least one photovoltaic module 301 may be connected in series, in parallel, or both in series and in parallel to form one or more photovoltaic subarrays 303, and an output end of the photovoltaic subarray 303 is separately connected to the control device 302. It should be noted that FIG. 3 merely uses an example in which the at least one photovoltaic module 301 is connected in series to form a plurality of photovoltaic subarrays, and this does not constitute any limitation to this application.

Further, the photovoltaic power generation system 300 may further include at least one converter 304, one of the converter 304 is connected to one of the photovoltaic module 301, and is configured to: adjust an output voltage or current of the photovoltaic module 301 connected to the converter 304, so that the photovoltaic module 301 connected to the converter 304 works at a maximum output power, to increase an output power of a photovoltaic subarray 303 in which the photovoltaic module 301 connected to the converter 304 is located, thereby increasing a power generation capacity of the entire photovoltaic power generation system 300; and adjust an output voltage or an output current of the converter 304 under control of the control device 302. The converter 304 may be a DC/DC converter, and a specific circuit topology structure of the converter 304 may be an upgrade circuit, a buck circuit, or a boost circuit, and may be of an isolation structure or a non-isolation structure.

Figure 4:
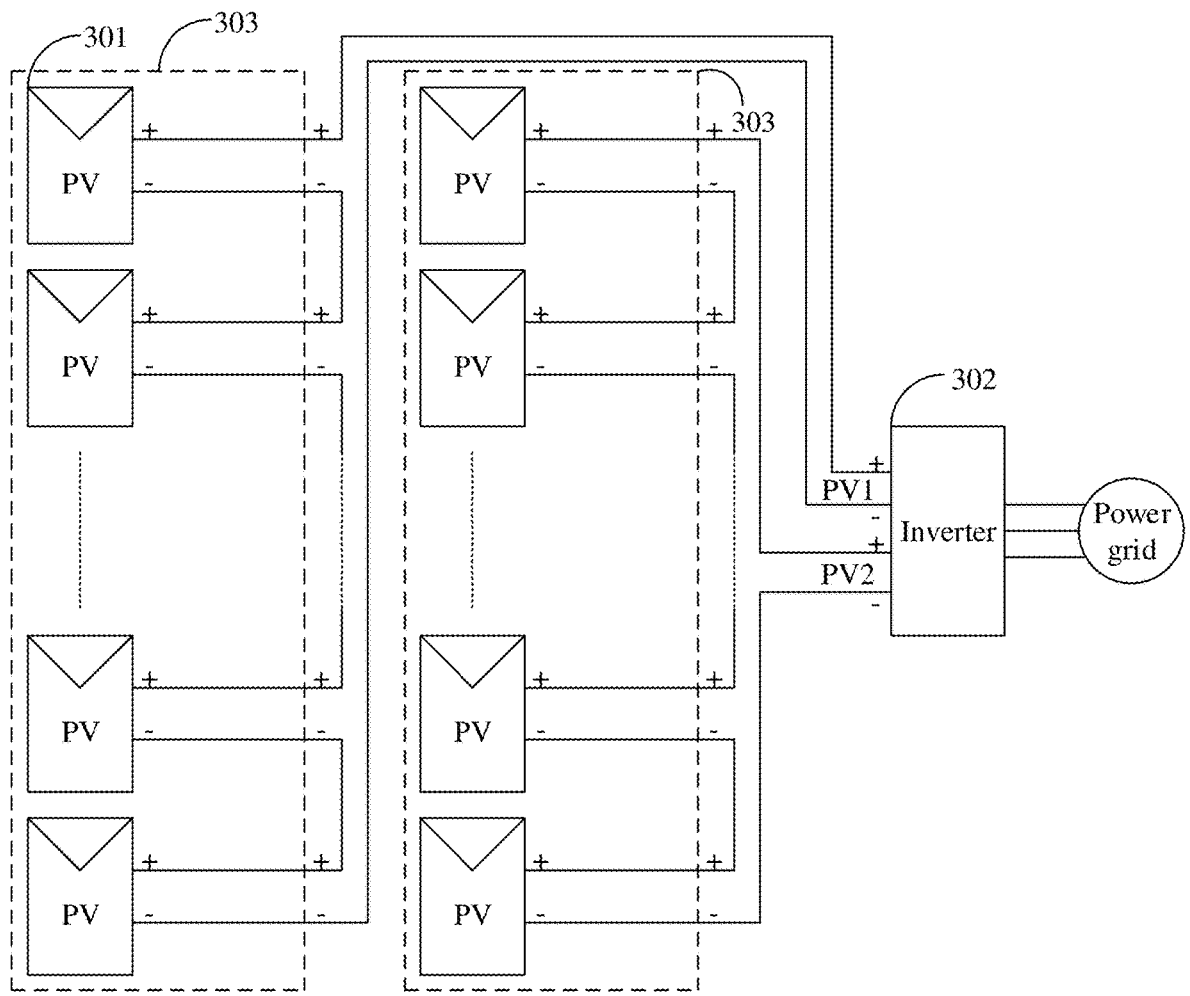
FIG. 4 is a first specific schematic structural diagram of a photovoltaic power generation system according to an embodiment of this application.
Figure 5:
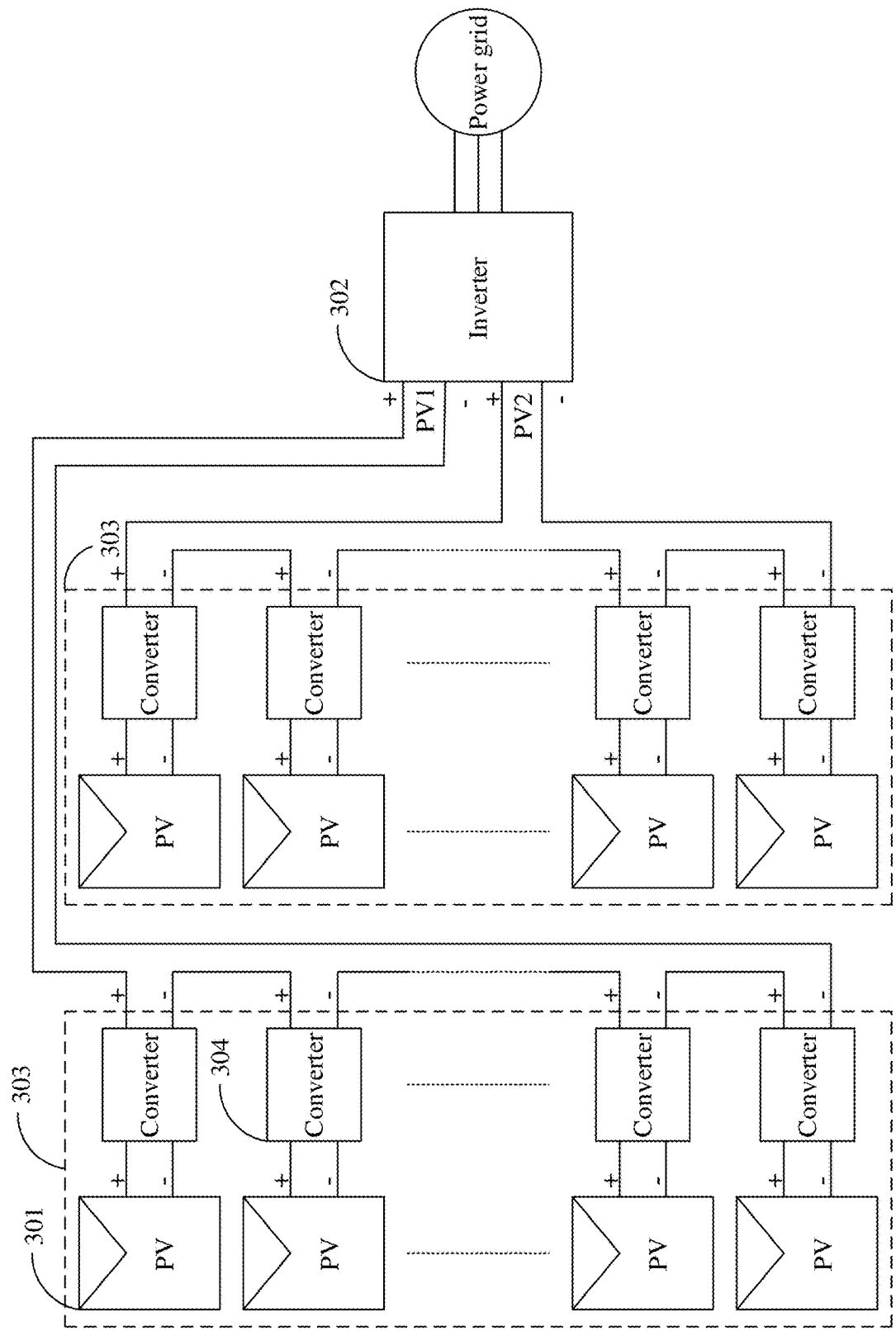
FIG. 5 is a second specific schematic structural diagram of a photovoltaic power generation system according to an embodiment of this application.
Figure 6:
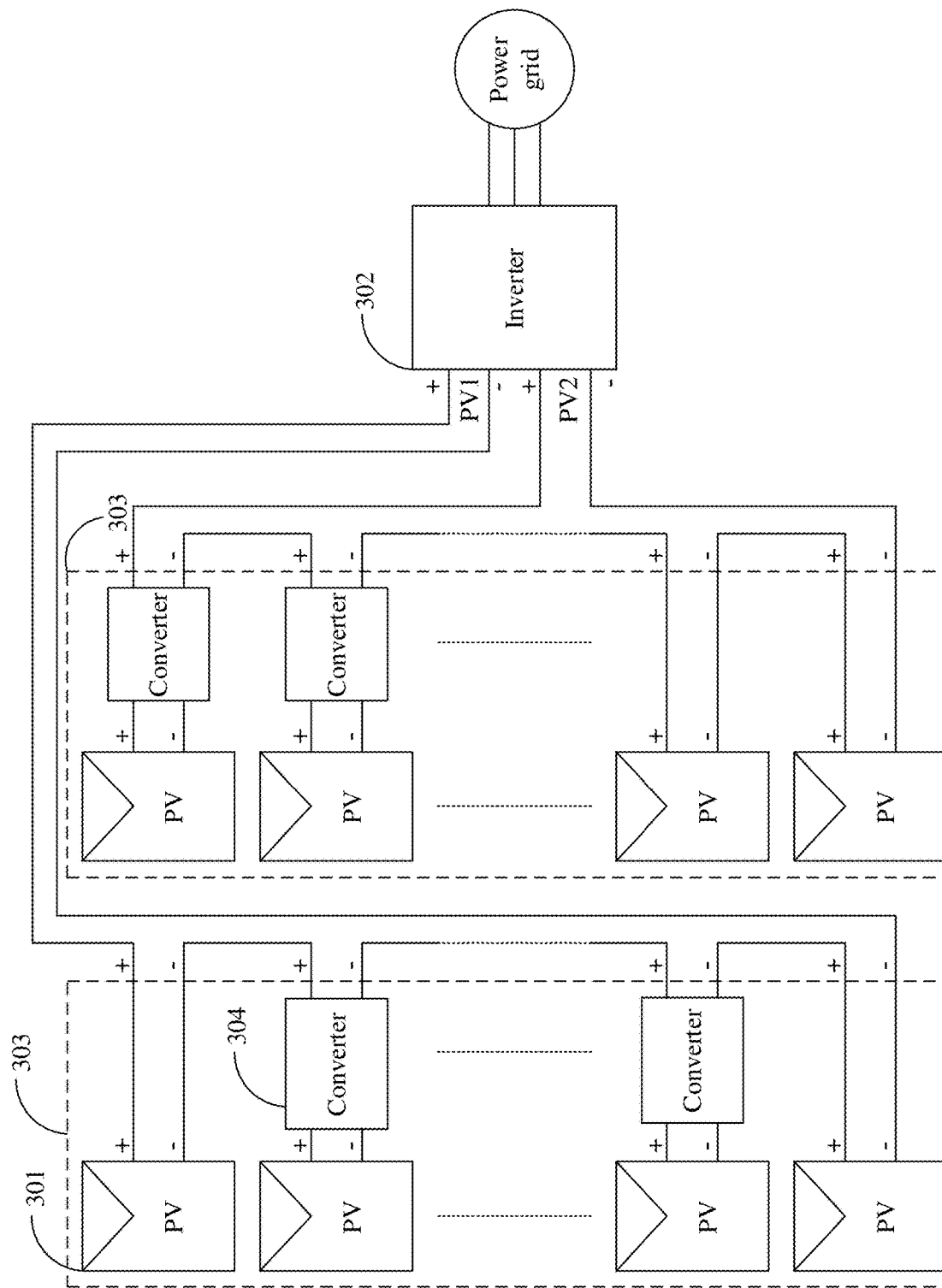
FIG. 6 is a third specific schematic structural diagram of a photovoltaic power generation system according to an embodiment of this application.

In other words, the photovoltaic power generation system 300 may be a power generation system in which no converter 304 is configured in each photovoltaic module 301, for example, a photovoltaic power generation system shown in FIG. 4, or may be a power generation system in which the converter 304 is configured in each photovoltaic module 301, for example, a photovoltaic power generation system shown in FIG. 5, or may be a power generation system in which the converter 304 is configured in some photovoltaic modules 301, for example, a photovoltaic power generation system shown in FIG. 6. Each of the photovoltaic power generation systems shown in FIG. 4 to FIG. 6 includes a plurality of photovoltaic subarrays 303, and each photovoltaic subarray 303 includes a plurality of photovoltaic modules 301 connected in series, and is also referred to as a photovoltaic string.

Figure 7:
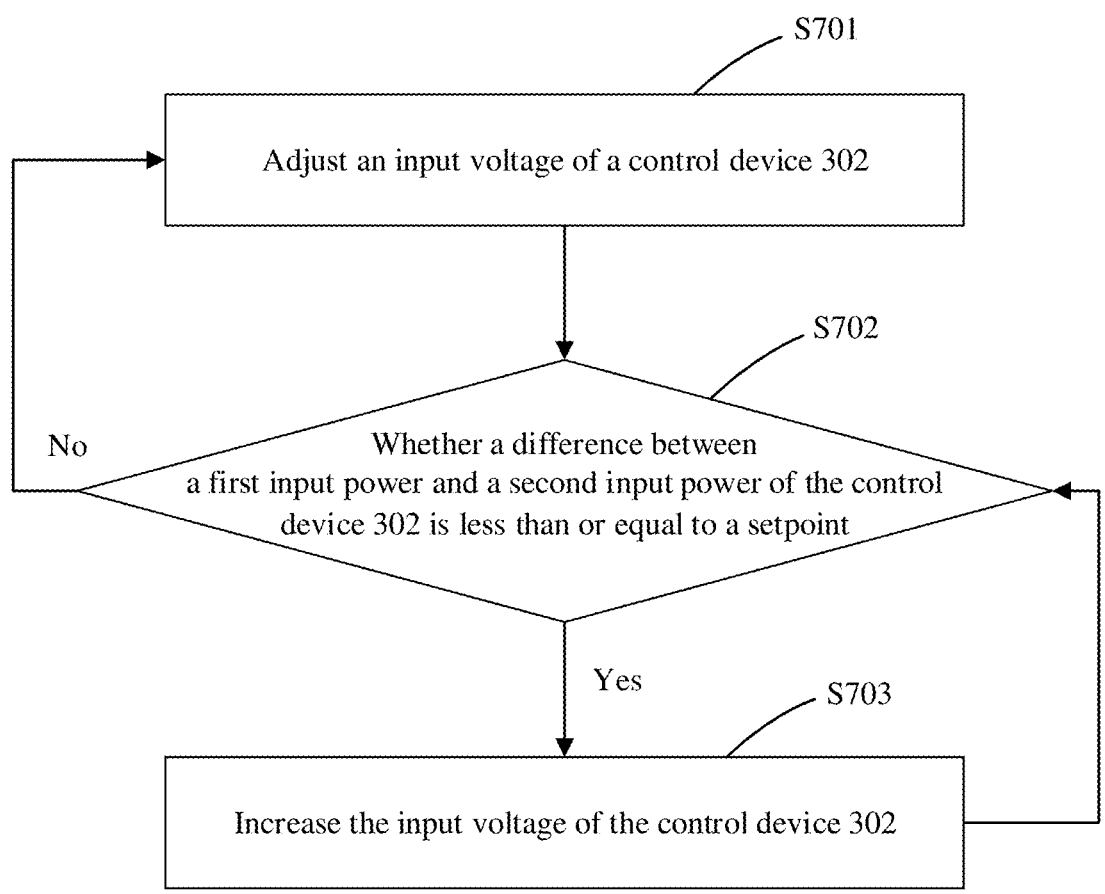
FIG. 7 is a schematic flowchart of a maximum power point tracking method according to an embodiment of this application.

As shown in FIG. 7, this application provides a maximum power point tracking method, applied to photovoltaic power generation systems 300 shown in FIG. 2 to FIG. 6. The method is performed by a control device 302 in the photovoltaic power generation system 300, and specifically includes the following operations.

S701: Adjust an input voltage of the control device 302.

The input voltage is generated by one or more of the photovoltaic module 301 and is transmitted to the control device 302. The input voltage is directly or indirectly output by one or more of the photovoltaic module 301 to the control device 302.

The control device 302 mainly performs power conversion in the power generation system 300, and can control an output power of the control device 302. When the output power of the control device 302 changes, an input power of the control device 302 also changes, and when the input power of the control device 302 changes, an input voltage of the control device 302 also changes. Therefore, the control device 302 may adjust the output power of the control device 302 to adjust the input voltage of the control device 302. For example, when the control device 302 is an inverter, the inverter may adjust a duty cycle of a signal used to control a switching transistor in the inverter, to adjust an output power of the inverter, to achieve an objective of adjusting an input voltage of the inverter.

S702: Determine whether a difference between a first input power and a second input power of the control device 302 is less than or equal to a setpoint, and if the difference is less than or equal to the setpoint, perform operation S703, or if the difference is greater than the setpoint, perform operation S701.

The first input power is an input power of the control device that is obtained before the input voltage of the control device is adjusted, and the second input power is an input power of the control device that is obtained after the input voltage of the control device is adjusted. The difference between the first input power and the second input power of the control device 302 is an absolute value of the difference between the first input power and the second input power, that is, $\Delta P=|P1-P2|$. $\Delta P$ is the difference between the first input power and the second input power, P1 is the first input power, and P2 is the second input power.

The setpoint may be determined based on factors such as a power generation efficiency requirement and control precision of the photovoltaic power generation system 300. When the difference between the first input power and the second input power of the control device 302 is less than or equal to the setpoint, the first input power is equal to or approximately equal to the second input power.

S703: Increase the input voltage of the control device 302, and perform operation S702.

In an embodiment, when the difference between the first input power and the second input power is greater than the setpoint, the input voltage of the control device may be adjusted by using the following method:

i. when the first input power is less than the second input power, if the input voltage of the control device 302 before the adjustment is greater than an input voltage of the control device 302 obtained after the adjustment, it indicates that decreasing the input voltage of the control device 302 can increase the input power of the control device 302, and the input voltage of the control device is decreased, or if the input voltage of the control device before the adjustment is less than an input voltage of the control device obtained after the adjustment, it indicates that increasing the input voltage of the control device 302 can increase the input power of the control device 302, and the input voltage of the control device 302 is increased; or ii. when the first input power is greater than the second input power, if the input voltage of the control device 302 before the adjustment is greater than an input voltage of the control device 302 obtained after the adjustment, it indicates that decreasing the input voltage of the control device 302 does not help to increase the input power of the control device 302, and the input voltage of the control device 302 is increased, or if the input voltage of the control device 302 before the adjustment is less than an input voltage of the control device 302 obtained after the adjustment, it indicates that increasing the input voltage of the control device 302 does not help to increase the input power of the control device 302, and the input voltage of the control device 302 is decreased.

Specifically, before the control device 302 adjusts the input voltage of the control device 302, an input voltage and an input current of the control device 302 are sampled, to obtain a current input voltage and input current of the control device 302, the input power of the control device 302 is determined based on the current input voltage and input current, and the determined input power is used as the first input power. After the control device 302 adjusts the input voltage of the control device 302, an input voltage and an input current of the control device 302 are sampled, to obtain a current input voltage and input current of the control device 302, the input power of the control device 302 is determined based on the obtained input voltage and input current, and the determined input power is used as the second input power. When the difference between the first input power and the second input power of the control device 302 is greater than the setpoint, the control device 302 needs to continue to adjust the input voltage of the control device 302, and in this case, the control device 302 updates the first input power to an input power of the control device 302 that is obtained after the input voltage of the control device 302 is adjusted previously (that is, the second input power obtained after the input voltage of the control device 302 is adjusted previously), continues to adjust the input voltage of the control device 302, samples an input voltage and an input current of the control device 302, to obtain a current input voltage and input current of the control device 302, determines an input power of the control device 302 based on the obtained input voltage and input current, and uses the determined input power as the first input power.

According to the foregoing method, the control device 302 adjusts the input voltage of the control device 302, and determines whether the input powers that are obtained before and after the input voltage of the control device 302 is adjusted are equal or approximately equal, and if the input powers are equal or approximately equal, increases the input voltage of the control device 302, and continues to determine whether the input powers that are obtained before and after the input voltage of the control device 302 is adjusted are equal or approximately equal; or if the input powers are not equal or approximately equal, continues to adjust the input voltage of the control device 302, so that the control device 302 works at a maximum input power point. When the control device 302 works at the maximum input power point, the input voltage of the control device 302 is relatively high, so that conversion efficiency of the control device 302 can be improved to the greatest extent, and a loss of a power generation capacity of the photovoltaic power generation system can be reduced.

Figure 8:
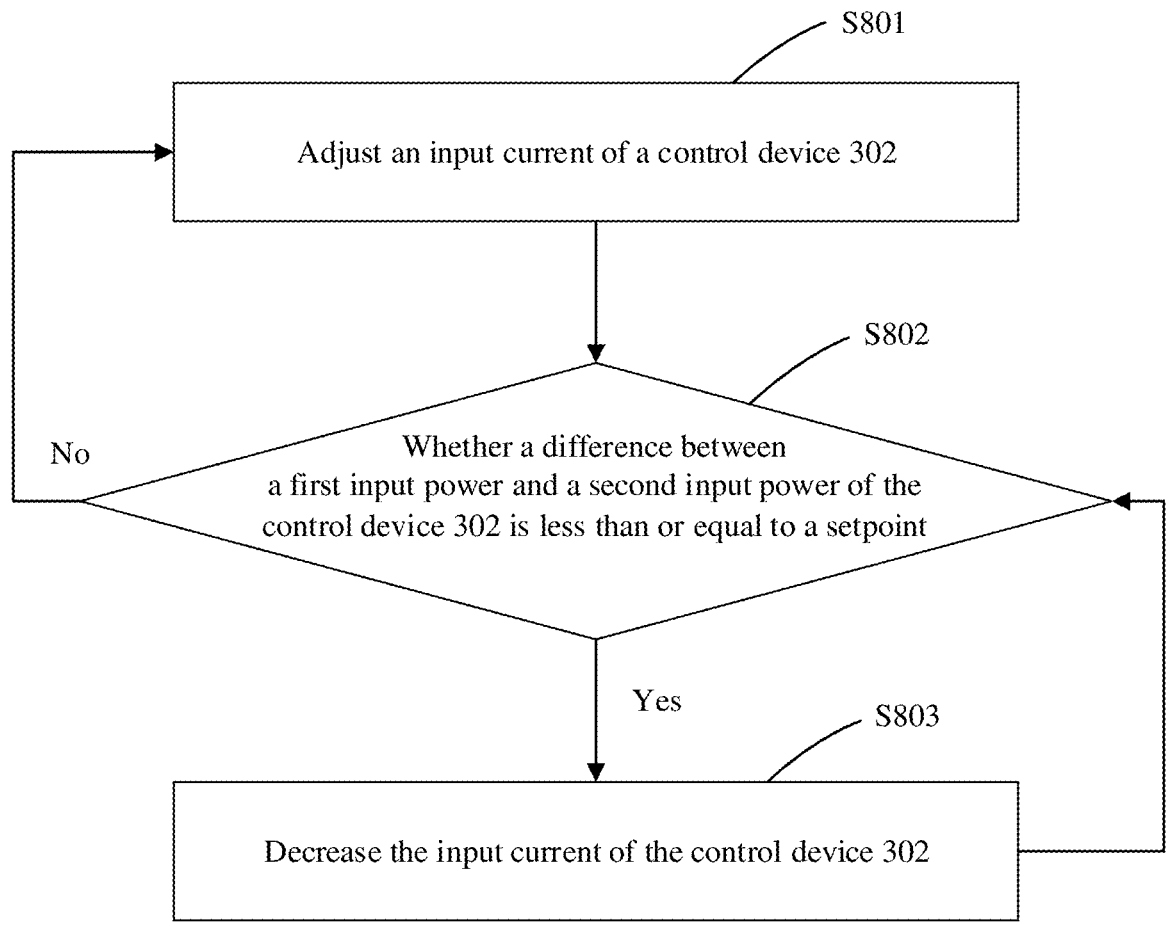
FIG. 8 is a schematic structural diagram of another maximum power point tracking method according to an embodiment of this application.

As shown in FIG. 8, this application provides another maximum power point tracking method, applied to photovoltaic power generation systems 300 shown in FIG. 2 to FIG. 6. The method is performed by a control device 302 in the photovoltaic power generation system 300, and specifically includes the following operations.

S801: Adjust an input current of the control device 302.

The input current is generated by one or more of the photovoltaic module 301 and is transmitted to the control device 302. The input current is directly or indirectly output by one or more of the photovoltaic module 301 to the control device 302.

S802: Determine whether a difference between a first input power and a second input power of the control device 302 is less than or equal to a setpoint, and if the difference is less than or equal to the setpoint, perform operation S803, or if the difference is greater than the setpoint, perform S801.

The first input power is an input power of the control device that is obtained before the input current of the control device is adjusted, and the second input power is an input power of the control device that is obtained after the input current of the control device is adjusted. The difference between the first input power and the second input power of the control device 302 is an absolute value of the difference between the first input power and the second input power, that is, $\Delta P=|P1-P2|$. $\Delta P$ is the difference between the first input power and the second input power, P1 is the first input power, and P2 is the second input power.

The control device 302 mainly performs power conversion in the power generation system 300, and can control an output power of the control device 302. When the output power of the control device 302 changes, an input power of the control device 302 also changes, and when the input power of the control device 302 changes, an input current of the control device 302 also changes. Therefore, the control device 302 may adjust the output power of the control device 302 to adjust the input voltage of the control device 302. For example, when the control device 302 is an inverter, the inverter may adjust a duty cycle of a signal used to control a switching transistor in the inverter, to adjust an output power of the inverter, to achieve an objective of adjusting an input current of the inverter.

The setpoint may be determined based on factors such as a power generation efficiency requirement and control precision of the photovoltaic power generation system 300. When the difference between the first input power and the second input power of the control device 302 is less than or equal to the setpoint, the first input power is equal to or approximately equal to the second input power.

S803: Decrease the input current of the control device, and perform S802.

In an embodiment, when the difference between the first input power and the second input power is greater than the setpoint, the control device 302 may adjust the input current of the control device by using the following method:

(1). when the first input power is less than the second input power, if the input current of the control device 302 before the adjustment is greater than an input current of the control device 302 obtained after the adjustment, it indicates that decreasing the input current of the control device 302 can increase the input power of the control device 302, and the input current of the control device 302 is decreased, or if the input current of the control device 302 before the adjustment is less than an input current of the control device 302 obtained after the adjustment, it indicates that increasing the input current of the control device 302 can increase the input power of the control device 302, and the input current of the control device 302 is increased; or (2). when the first input power is greater than the second input power, if the input current of the control device 302 before the adjustment is greater than an input current of the control device 302 obtained after the adjustment, it indicates that decreasing the input current of the control device 302 does not help to increase the input power of the control device 302, and the input current of the control device 302 is increased, or if the input current of the control device 302 before the adjustment is less than an input current of the control device 302 obtained after the adjustment, it indicates that increasing the input current of the control device 302 does not help to increase the input power of the control device 302, and the input current of the control device 302 is decreased.

Specifically, before the control device 302 adjusts the input current of the control device 302 for the first time, an input current and an input voltage of the control device 302 are sampled, to obtain a current input current and input voltage of the control device 302, the input power of the control device 302 is determined based on the current input current and input voltage, and the determined input power is used as the first input power. After the control device 302 adjusts the input current of the control device 302, an input current and an input voltage of the control device 302 are sampled, to obtain a current input current and input voltage of the control device 302, the input power of the control device 302 is determined based on the obtained input current and input voltage, and the determined input power is used as the second input power. When the difference between the first input power and the second input power of the control device 302 is greater than the setpoint, the control device 302 needs to continue to adjust the input current of the control device 302, and in this case, the control device 302 updates the first input power to an input power of the control device 302 that is obtained after the input current of the control device 302 is adjusted previously (that is, the second input power obtained after the input current of the control device 302 is adjusted previously), continues to adjust the input current of the control device 302, samples an input current and an input voltage of the control device 302, to obtain a current input current and input voltage of the control device 302, determines an input power of the control device 302 based on the obtained input current and input voltage, and uses the determined input power as the second input power.

According to the foregoing method, the control device 302 adjusts the input current of the control device 302, and determines whether the input powers that are obtained before and after the input current of the control device 302 is adjusted are equal or approximately equal, and if the input powers are equal or approximately equal, decreases the input current of the control device 302, and continues to determine whether the input powers that are obtained before and after the input current of the control device 302 is adjusted are equal or approximately equal; or if the input powers are not equal or approximately equal, continues to adjust the input current of the control device 302, so that the control device 302 works at a maximum input power point. When the control device 302 works at the maximum input power point, the input current of the control device 302 is relatively low, so that conversion efficiency of the control device 302 can be improved to the greatest extent, and a loss of a power generation capacity of the photovoltaic power generation system can be reduced.

Figure 9:
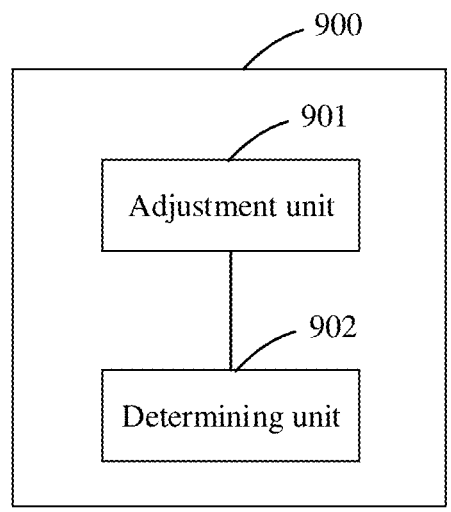
FIG. 9 is a schematic structural diagram of a control device according to an embodiment of this application.

Based on a same idea, this application further provides a control device. The control device is applied to a photovoltaic power generation system, and the photovoltaic power generation system includes the control device and at least one photovoltaic module. As shown in FIG. 9, the control device 900 includes an adjustment unit 901 and a determining unit 902.

In an embodiment, the control device 900 is configured to perform the maximum power point tracking method shown in FIG. 7.

The adjustment unit 901 is configured to adjust an input voltage of the control device 900, where the input voltage is generated by one or more of the photovoltaic module and is transmitted to the control device.

The determining unit 902 is configured to determine whether a difference between a first input power and a second input power of the control device 900 is less than or equal to a setpoint, where the first input power is an input power of the control device 900 that is obtained before the input voltage of the control device is adjusted, and the second input power is an input power of the control device 900 that is obtained after the input voltage of the control device 900 is adjusted.

When the difference between the first input power and the second input power of the control device 900 is less than or equal to the setpoint, the adjustment unit 901 is further configured to: increase the input voltage of the control device, and trigger the determining unit 902 to determine whether the difference between the first input power and the second input power of the control device is less than or equal to the setpoint.

When the difference between the first input power and the second input power of the control device 900 is greater than the setpoint, the determining unit 902 is further configured to trigger the adjustment unit 901 to adjust the input voltage of the control device 900.

In an embodiment, when the difference between the first input power and the second input power is greater than the setpoint, the adjustment unit 901 is specifically configured to:

when the first input power is less than the second input power, if the input voltage of the control device 900 before the adjustment is greater than an input voltage of the control device 900 obtained after the adjustment, decrease the input voltage of the control device 900, or if the input voltage of the control device 900 before the adjustment is less than an input voltage of the control device 900 obtained after the adjustment, increase the input voltage of the control device 900; or when the first input power is greater than the second input power, if the input voltage of the control device 900 before the adjustment is greater than an input voltage of the control device 900 obtained after the adjustment, increase the input voltage of the control device 900, or if the input voltage of the control device 900 before the adjustment is less than an input voltage of the control device 900 obtained after the adjustment, decrease the input voltage of the control device 900.

In an embodiment, the control device 900 is configured to perform the maximum power point tracking method shown in FIG. 8.

The adjustment unit 901 is configured to adjust an input current of the control device 900, where the input current is generated by one or more of the photovoltaic module and is transmitted to the control device.

The determining unit 902 is configured to determine whether a difference between a first input power and a second input power of the control device 900 is less than or equal to a setpoint, where the first input power is an input power of the control device 900 that is obtained before the input current of the control device is adjusted, and the second input power is an input power of the control device 900 that is obtained after the input current of the control device 900 is adjusted.

When the difference between the first input power and the second input power of the control device 900 is less than or equal to the setpoint, the adjustment unit 901 is further configured to: decrease the input current of the control device 900, and trigger the determining unit 902 to determine whether the difference between the first input power and the second input power of the control device is less than or equal to the setpoint.

When the difference between the first input power and the second input power of the control device 900 is greater than the setpoint, the determining unit 902 is further configured to trigger the adjustment unit 901 to adjust the input current of the control device 900.

In an embodiment, when the difference between the first input power and the second input power is greater than the setpoint, the adjustment unit 901 is specifically configured to:

when the first input power is less than the second input power, if the input current of the control device 900 before the adjustment is greater than an input current of the control device 900 obtained after the adjustment, decrease the input current of the control device 900, or if the input current of the control device 900 before the adjustment is less than an input current of the control device 900 obtained after the adjustment, increase the input current of the control device 900; or when the first input power is greater than the second input power, if the input current of the control device 900 before the adjustment is greater than an input current of the control device 900 obtained after the adjustment, increase the input current of the control device 900, or if the input current of the control device 900 before the adjustment is less than an input current of the control device 900 obtained after the adjustment, decrease the input current of the control device 900.

It should be noted that in the embodiments of this application, unit division is an example, and is merely a logical function division. In an embodiment, another division manner may be used. Functional modules in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the operations of the methods described in the embodiments of this application. The foregoing storage medium includes various media capable of storing program code such as a removable hard disk, a read-only memory (ROM), or a random access memory (RAM).

Figure 10:
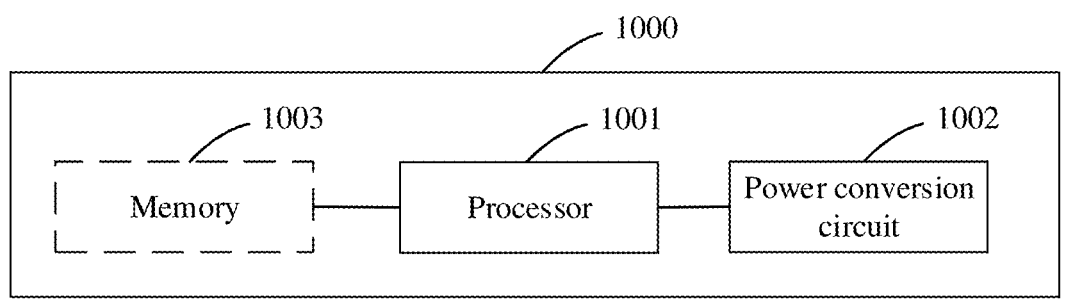
FIG. 10 is a schematic structural diagram of another control device according to an embodiment of this application.

Based on a same idea, this application further provides a control device. The control device is applied to a photovoltaic power generation system, and the photovoltaic power generation system includes the control device and at least one photovoltaic module. As shown in FIG. 10, the control device 1000 includes a processor 1001 and a power conversion circuit 1002.

The processor 1001 may be a central processing unit (CPU) or a microcontroller unit (MCU). Further, the control device 1000 may further include a memory 1003, configured to store a program instruction, so that the processor 1001 invokes the program instruction stored in the memory 1003 and the power conversion circuit 1002, to implement the maximum power point tracking method shown in FIG. 7 or FIG. 8. The memory 1003 may include a volatile memory such as a random-access memory (RAM); the memory 1003 may alternatively include a non-volatile memory such as a flash memory, a hard disk drive, or a solid-state drive; the memory 1003 may alternatively include a combination of the foregoing types of memories.

In an embodiment, the control device is configured to implement the maximum power point tracking method shown in FIG. 7, and has a function of the control device 900 shown in FIG. 9.

The processor 1001 is configured to: control the power conversion circuit 1002 to adjust an input voltage of the control device 1000, where the input voltage is generated by one or more of the photovoltaic module and is transmitted to the control device; and determine whether a difference between a first input power and a second input power of the control device is less than or equal to a setpoint, where the first input power is an input power of the control device 1000 that is obtained before the input voltage of the control device 1000 is adjusted, and the second input power is an input power of the control device 1000 that is obtained after the input voltage of the control device 1000 is adjusted; and when the difference between the first input power and the second input power is less than or equal to the setpoint, control the power conversion circuit 1002 to increase the input voltage of the control device 1000, and determine whether the difference between the first input power and the second input power of the control device 1000 is less than or equal to the setpoint; or when the difference between the first input power and the second input power is greater than the setpoint, control the power conversion circuit 1002 to adjust the input voltage of the control device 1000.

The power conversion circuit 1002 is configured to adjust the input voltage of the control device 1000 under control of the processor 1001.

In an embodiment, the adjusting, by the power conversion circuit 1002, the input voltage of the control device 1000 when the difference between the first input power and the second input power is greater than the setpoint includes:

when the first input power is less than the second input power, if the input voltage of the control device 1000 before the adjustment is greater than an input voltage of the control device 1000 obtained after the adjustment, decreasing the input voltage of the control device 1000, or if the input voltage of the control device 1000 before the adjustment is less than an input voltage of the control device 1000 obtained after the adjustment, increasing the input voltage of the control device 1000; or when the first input power is greater than the second input power, if the input voltage of the control device 1000 before the adjustment is greater than an input voltage of the control device 1000 obtained after the adjustment, increasing the input voltage of the control device 1000, or if the input voltage of the control device 1000 before the adjustment is less than an input voltage of the control device 1000 obtained after the adjustment, decreasing the input voltage of the control device 1000.

In an embodiment, the control device is configured to implement the maximum power point tracking method shown in FIG. 8, and has a function of the control device 900 shown in FIG. 9.

The processor 1001 is configured to: control the power conversion circuit 1002 to adjust an input current of the control device 1000, where the input current is generated by one or more of the photovoltaic module and is transmitted to the control device; and determine whether a difference between a first input power and a second input power of the control device is less than or equal to a setpoint, where the first input power is an input power of the control device 1000 that is obtained before the input current of the control device 1000 is adjusted, and the second input power is an input power of the control device 1000 that is obtained after the input current of the control device 1000 is adjusted; and when the difference between the first input power and the second input power is less than or equal to the setpoint, control the power conversion circuit 1002 to decrease the input current of the control device 1000, and determine whether the difference between the first input power and the second input power of the control device 1000 is less than or equal to the setpoint; or when the difference between the first input power and the second input power is greater than the setpoint, control the power conversion circuit 1002 to adjust the input current of the control device 1000.

The power conversion circuit 1002 is configured to adjust the input current of the control device 1000 under control of the processor 1001.

In an embodiment, the adjusting, by the power conversion circuit 1002, the input current of the control device 1000 when the difference between the first input power and the second input power is greater than the setpoint includes:

when the first input power is less than the second input power, if the input current of the control device 1000 before the adjustment is greater than an input current of the control device 1000 obtained after the adjustment, decreasing the input current of the control device 1000, or if the input current of the control device 1000 before the adjustment is less than an input current of the control device 1000 obtained after the adjustment, increasing the input current of the control device 1000; or when the first input power is greater than the second input power, if the input current of the control device 1000 before the adjustment is greater than an input current of the control device 1000 obtained after the adjustment, increasing the input current of the control device 1000, or if the input current of the control device 1000 before the adjustment is less than an input current of the control device 1000 obtained after the adjustment, decreasing the input current of the control device 1000.

Figure 11:
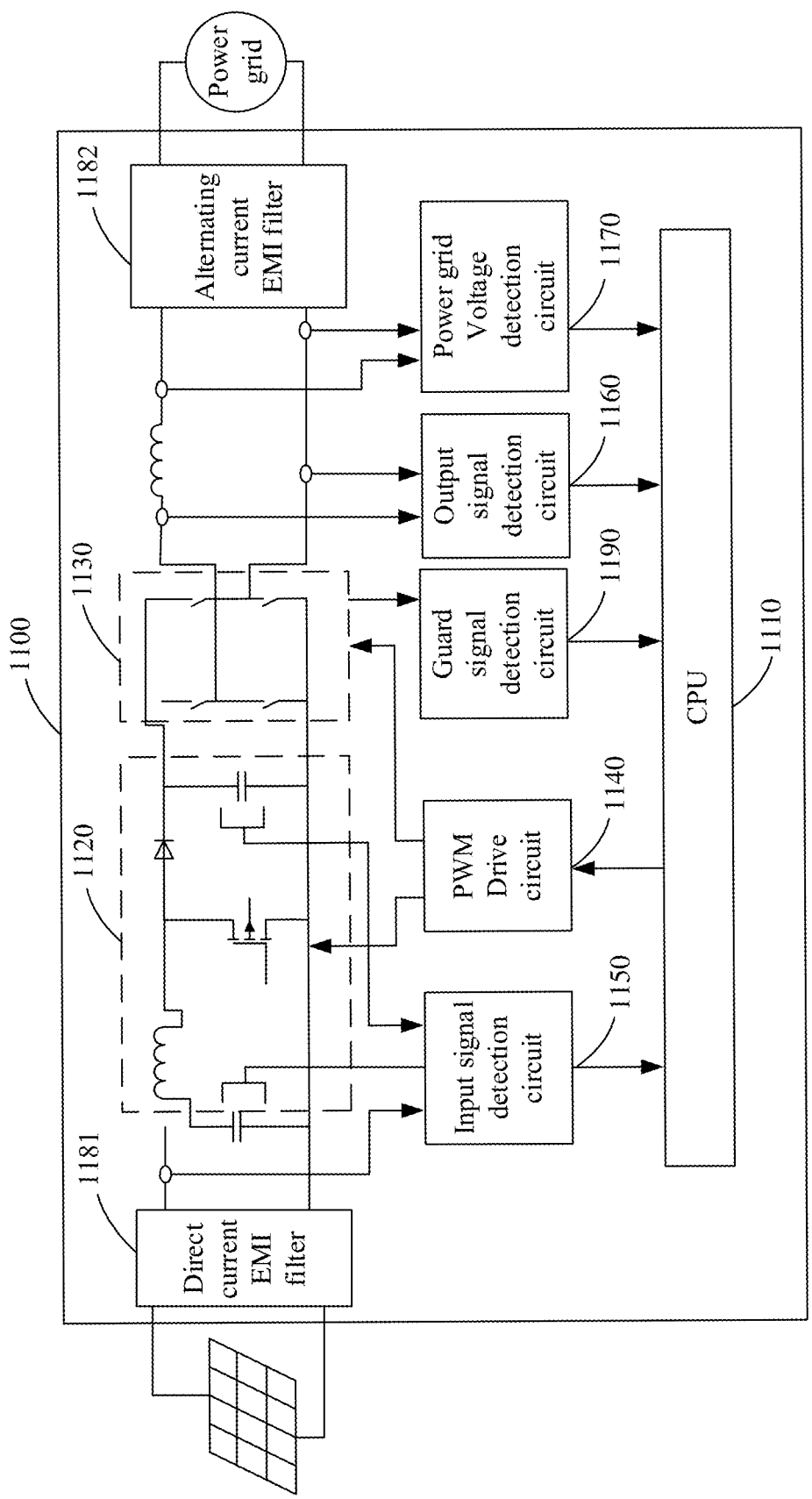
FIG. 11 is a schematic structural diagram of a grid-tied photovoltaic inverter according to an embodiment of this application.

The following describes in detail a specific structure of the control device 1000 by using an example in which the control device 1000 is a grid-tied photovoltaic inverter. As shown in FIG. 11, the grid-tied photovoltaic inverter 1100 mainly includes a CPU 1110, a boost DC-DC converter 1120, an H bridge inversion circuit 1130, a pulse width modulation (PWM) drive circuit 1140, an input signal detection circuit 1150, an output signal detection circuit 1160, and a power grid voltage detection circuit 1170.

The CPU 1110 is configured to: obtain corresponding detection signals by using the input signal detection circuit 1150, the output signal detection circuit 1160, and the power grid voltage detection circuit 1170, and determine a running status of the grid-tied photovoltaic inverter 1100 based on the obtained detection signal, to control the boost DC-DC converter 1120 and the H bridge inversion circuit 1130 based on the running status of the grid-tied photovoltaic inverter 1100 and by using the PWM drive circuit 1140.

The boost DC-DC converter 1120 is connected to an output end of a photovoltaic module by using a DC-link capacitor, and is configured to boost, under control of the CPU 1110, a voltage obtained from the photovoltaic module, and output a boosted voltage to the H bridge inversion circuit 1130. Specifically, the CPU 1110 controls a duty cycle of a pulse signal output by the PWM drive circuit 1140, to control a switching transistor in the boost DC-DC converter 1120, and control the boost DC-DC converter 1120 to boost the voltage obtained from the photovoltaic module.

The H bridge inversion circuit 1130 is configured to convert, under control of the CPU 1110, the voltage output by the boost DC-DC converter 1120 into an alternating current voltage, and input the alternating current voltage obtained through conversion to a power grid. Specifically, the CPU 1110 controls a duty cycle of a pulse signal output by the PWM drive circuit 1140, to control a switching transistor in the H bridge inversion circuit 1130, and control the H bridge inversion circuit 1130 to convert the voltage output by the boost DC-DC converter 1120 into the alternating current voltage.

The PWM drive circuit 1140 is configured to output, under control of the CPU 1110, a pulse signal of a corresponding duty cycle, to control the boost DC-DC converter 1120 and the H bridge inversion circuit 1130.

The input signal detection circuit 1150 is configured to: detect a voltage and a current output by the photovoltaic module, a voltage of the DC-link capacitor, and a voltage of a capacitor in the boost converter 1120, and feed the voltages and the current back to the CPU 1110.

The output signal detection circuit 1160 is configured to: detect a current (a voltage) output by the H bridge inversion circuit 1130, and feed the current (voltage) back to the CPU 1110.

The power grid voltage detection circuit 1170 is configured to: detect a voltage of the power grid, and feed the voltage back to the CPU 1100.

Further, the grid-tied photovoltaic inverter 1100 may further include a direct current electromagnetic interference (EMI) filter 1181, an alternating current EMI filter 1182, and a guard signal detection circuit 1190. The direct current EMI filter 1181 is configured to filter out a high frequency interference signal in an output signal of the photovoltaic module. The alternating current EMI filter 1182 is configured to filter out a high frequency interference signal in an output signal of the H bridge inversion circuit 1130. The guard signal detection circuit 1190 is configured to detect a guard signal that is output by the grid-tied photovoltaic inverter 1100 when the grid-tied photovoltaic inverter 1100 performs a guard action, and feed the guard signal back to the CPU 1100.

In an embodiment, the CPU 1110 is configured to implement a function of the processor 1001, and the PWM drive circuit 1140, the boost DC-DC converter 1120, and the H bridge inversion circuit 1130 are configured to implement a function of the power conversion circuit 1002. The CPU 1110 controls a duty cycle of a pulse signal output by the PWM drive circuit 1140, to control output signals of the boost DC-DC converter 1120 and the H bridge inversion circuit 1130, to adjust an output power of the grid-tied photovoltaic inverter 1100, and adjust an input voltage or an input current of the grid-tied photovoltaic inverter 1100. The CPU 1110 obtains, by using the input signal detection circuit 1150, a voltage and a current that are obtained before the input voltage or the input circuit of the grid-tied photovoltaic inverter 1100 is adjusted, obtains a first input power through calculation based on the obtained voltage and circuit, obtains, by using the input signal detection circuit 1150, a voltage and a current that are obtained after the input voltage or the input circuit of the grid-tied photovoltaic inverter 1100 is adjusted, and obtains a second input power through calculation based on the obtained voltage and circuit.

To sum up, this application provides the maximum power point tracking method and the device, applied to the photovoltaic power generation system, where the photovoltaic power generation system includes the control device and the at least one photovoltaic module. The control device adjusts the input signal (the input voltage or the input current) of the control device, and determines whether the input powers of the control device that are obtained before and after the adjustment are equal or approximately equal, and if the input powers are equal or approximately equal, increases the input voltage of the control device or decreases the input current of the control device, and continues to determine whether the input powers of the control device that are obtained before and after the adjustment are equal or approximately equal; or if the input powers are not equal or approximately equal, continues to adjust the input signal of the control device, so that the control device works at a maximum input power point. When the control device works at the maximum input power point, the input voltage of the control device is relatively high, and the input current of the control device is relatively low, so that conversion efficiency of the control device can be improved to the greatest extent, and a loss of a power generation capacity of the photovoltaic power generation system can be reduced.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations are performed on the computer or the another programmable device, thereby generating computer-implemented processing. Therefore, the instructions executed on the computer or the another programmable device provide operations for implementing a specific function in one or more processes in the flowcharts and/or in one or more blocks in the block diagrams.

A person skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A maximum power point tracking method, comprising:
adjusting, by a control device of a photovoltaic power generation system having at least one photovoltaic module, an input voltage of the control device, wherein the input voltage is generated by the photovoltaic module and is transmitted to the control device;

determining whether a difference between a first input power and a second input power of the control device is less than or equal to a setpoint, wherein the first input power is an input power of the control device that is obtained before the input voltage of the control device is adjusted, and the second input power is an input power of the control device that is obtained after the input voltage of the control device is adjusted;

when the difference between the first input power and the second input power is less than or equal to the setpoint, increasing the input voltage of the control device, and determining whether the difference between the first input power and the second input power of the control device is less than or equal to the setpoint; and adjusting the input voltage of the control device when the difference between the first input power and the second input power is greater than the setpoint.

2. The method according to claim 1, wherein the adjusting the input voltage of the control device comprises:

when the first input power is less than the second input power, if the input voltage of the control device before the adjustment is greater than an input voltage of the control device obtained after the adjustment, decreasing the input voltage of the control device, or if the input voltage of the control device before the adjustment is less than an input voltage of the control device obtained after the adjustment, increasing the input voltage of the control device; or when the first input power is greater than the second input power, if the input voltage of the control device before the adjustment is greater than an input voltage of the control device obtained after the adjustment, increasing the input voltage of the control device, or if the input voltage of the control device before the adjustment is less than an input voltage of the control device obtained after the adjustment, decreasing the input voltage of the control device.

3. The method according to claim 1, wherein the control device is an inverter or a solar charger.

4. A maximum power point tracking method, comprising:

adjusting, by a control device of a photovoltaic power generation system, an input current of the control device generated by one or more photovoltaic modules of the photovoltaic power generation system and is transmitted to the control device;

determining whether a difference between a first input power and a second input power of the control device is less than or equal to a setpoint, wherein the first input power is an input power of the control device that is obtained before the input current of the control device is adjusted, and the second input power is an input power of the control device that is obtained after the input current of the control device is adjusted;

when the difference between the first input power and the second input power is less than or equal to the setpoint, decreasing the input current of the control device, and determining whether the difference between the first input power and the second input power of the control device is less than or equal to the setpoint; and adjusting the input current of the control device when the difference between the first input power and the second input power is greater than the setpoint.

5. The method according to claim 4, wherein adjusting the input current of the control device comprises:

when the first input power is less than the second input power, if the input current of the control device before the adjustment is greater than an input current of the control device obtained after the adjustment, decreasing the input current of the control device, or if the input current of the control device before the adjustment is less than an input current of the control device obtained after the adjustment, increasing the input current of the control device; or when the first input power is greater than the second input power, if the input current of the control device before the adjustment is greater than an input current of the control device obtained after the adjustment, increasing the input current of the control device, or if the input current of the control device before the adjustment is less than an input current of the control device obtained after the adjustment, decreasing the input current of the control device.

6. The method according to claim 4, wherein the control device is an inverter or a solar charger.

7. A control device of a photovoltaic power generation system, comprising:

an adjustment unit configured to adjust an input voltage of the control device generated by one or more photovoltaic modules of the photovoltaic power generation system and is transmitted to the control device;

a determining unit configured to determine whether a difference between a first input power and a second input power of the control device is less than or equal to a setpoint, wherein the first input power is an input power of the control device that is obtained before the input voltage of the control device is adjusted, and the second input power is an input power of the control device that is obtained after the input voltage of the control device is adjusted;

wherein when the difference between the first input power and the second input power of the control device is less than or equal to the setpoint, the adjustment unit is further configured to: increase the input voltage of the control device, and trigger the determining unit to determine whether the difference between the first input power and the second input power of the control device is less than or equal to the setpoint; and wherein when the difference between the first input power and the second input power of the control device is greater than the setpoint, the determining unit is further configured to trigger the adjustment unit to adjust the input voltage of the control device.

8. The control device according to claim 7, wherein when the difference between the first input power and the second input power is greater than the setpoint, the adjustment unit is configured to:

when the first input power is less than the second input power, if the input voltage of the control device before the adjustment is greater than an input voltage of the control device obtained after the adjustment, decrease the input voltage of the control device, or if the input voltage of the control device before the adjustment is less than an input voltage of the control device obtained after the adjustment, increase the input voltage of the control device; or when the first input power is greater than the second input power, if the input voltage of the control device before the adjustment is greater than an input voltage of the control device obtained after the adjustment, increase the input voltage of the control device, or if the input voltage of the control device before the adjustment is less than an input voltage of the control device obtained after the adjustment, decrease the input voltage of the control device.

9. The control device according to claim 7, wherein the control device is an inverter or a solar charger.

10. A control device of a photovoltaic power generation system, comprising:
   an adjustment unit configured to adjust an input current of the control device generated by one or more photovoltaic modules of the photovoltaic power generation system and is transmitted to the control device;
   a determining unit configured to determine whether a difference between a first input power and a second input power of the control device is less than or equal to a setpoint, wherein the first input power is an input power of the control device that is obtained before the input current of the control device is adjusted, and the second input power is an input power of the control device that is obtained after the input current of the control device is adjusted;
   wherein when the difference between the first input power and the second input power of the control device is less than or equal to the setpoint, the adjustment unit is further configured to: decrease the input current of the control device, and trigger the determining unit to determine whether the difference between the first input power and the second input power of the control device is less than or equal to the setpoint; and
   wherein when the difference between the first input power and the second input power of the control device is greater than the setpoint, the determining unit is further configured to trigger the adjustment unit to adjust the input current of the control device.

11. The control device according to claim 10, wherein when the difference between the first input power and the second input power is greater than the setpoint, the adjustment unit is configured to:
   when the first input power is less than the second input power, if the input current of the control device before the adjustment is greater than an input current of the control device obtained after the adjustment, decrease the input current of the control device, or if the input current of the control device before the adjustment is less than an input current of the control device obtained after the adjustment, increase the input current of the control device; or
   when the first input power is greater than the second input power, if the input current of the control device before the adjustment is greater than an input current of the control device obtained after the adjustment, increase the input current of the control device, or if the input current of the control device before the adjustment is less than an input current of the control device obtained after the adjustment, decrease the input current of the control device.

12. The control device according to claim 10, wherein the control device is an inverter or a solar charger.

* * * * *